Nov. 19, 1935.  R. H. UPSON  2,021,470
AIRCRAFT
Original Filed May 13, 1931  4 Sheets-Sheet 3
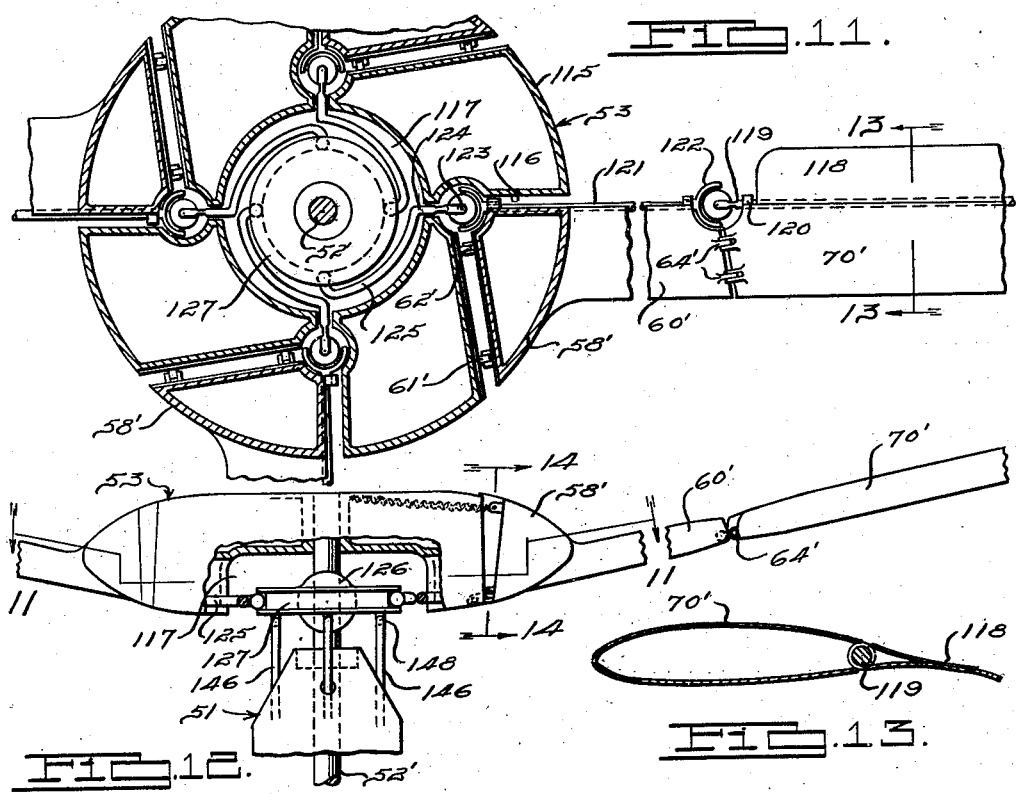
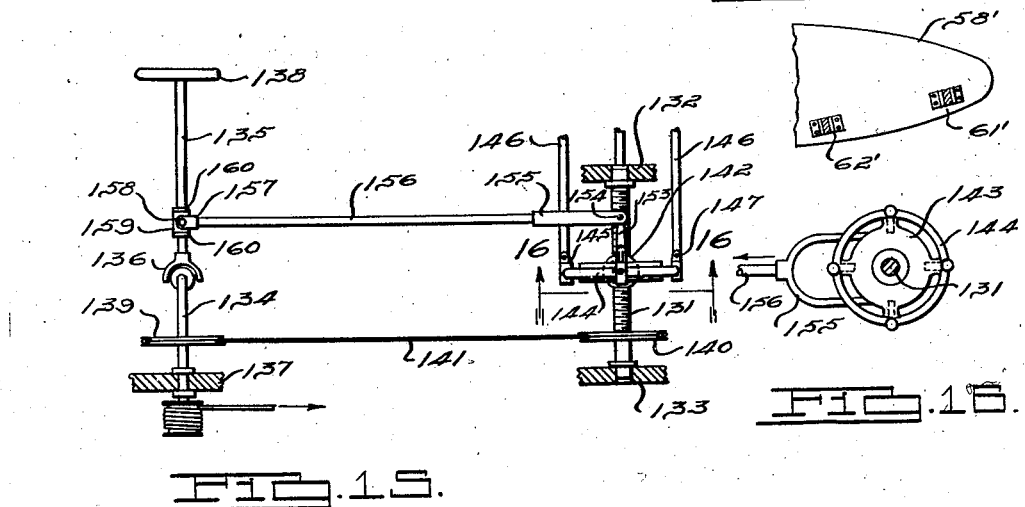
INVENTOR
RALPH H. UPSON
BY
ATTORNEYS Nov. 19, 1935.     R. H. UPSON     2,021,470
AIRCRAFT
Original Filed May 13, 1931    4 Sheets-Sheet 4
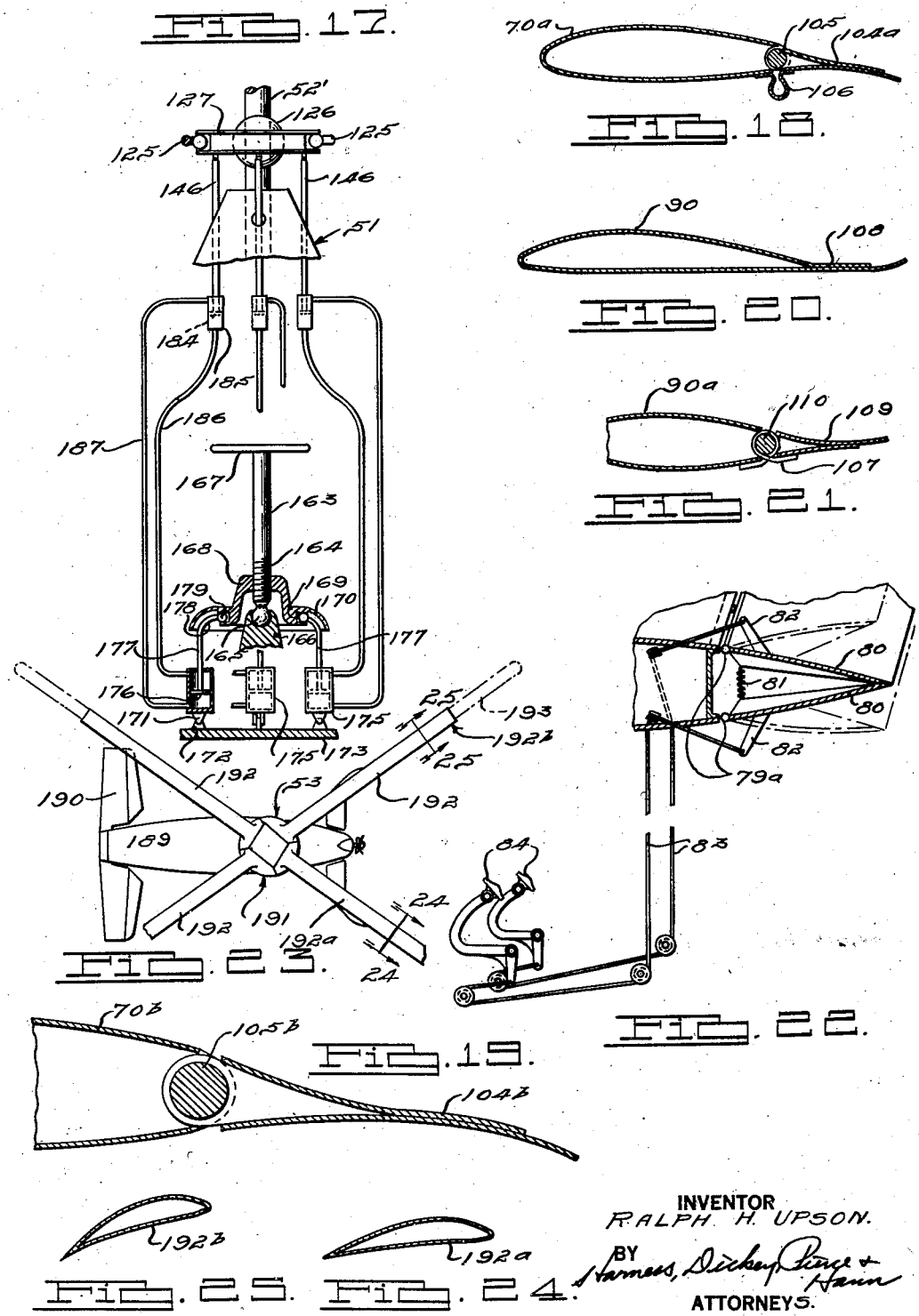
INVENTOR
RALPH H. UPSON.
BY
ATTORNEYS.

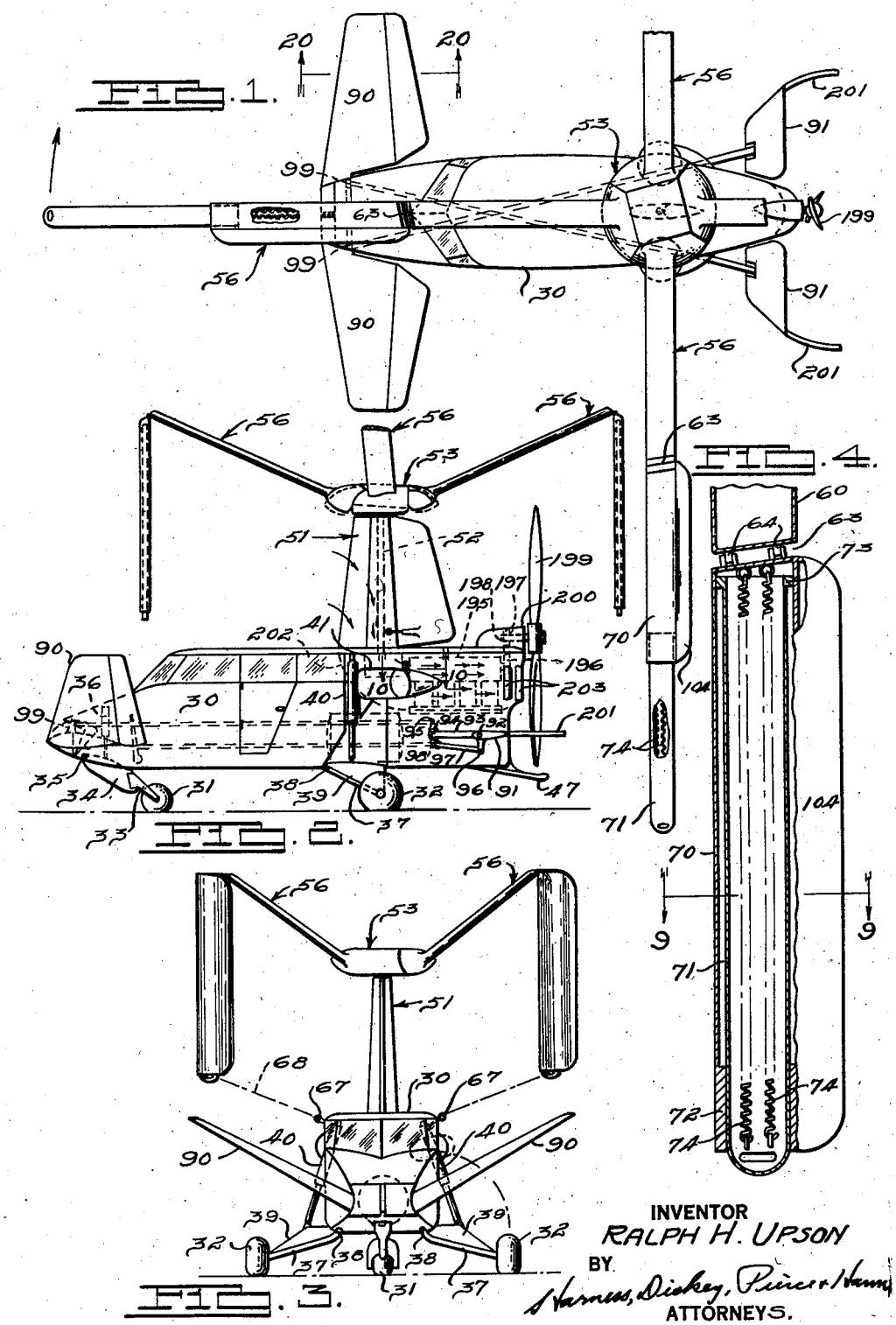

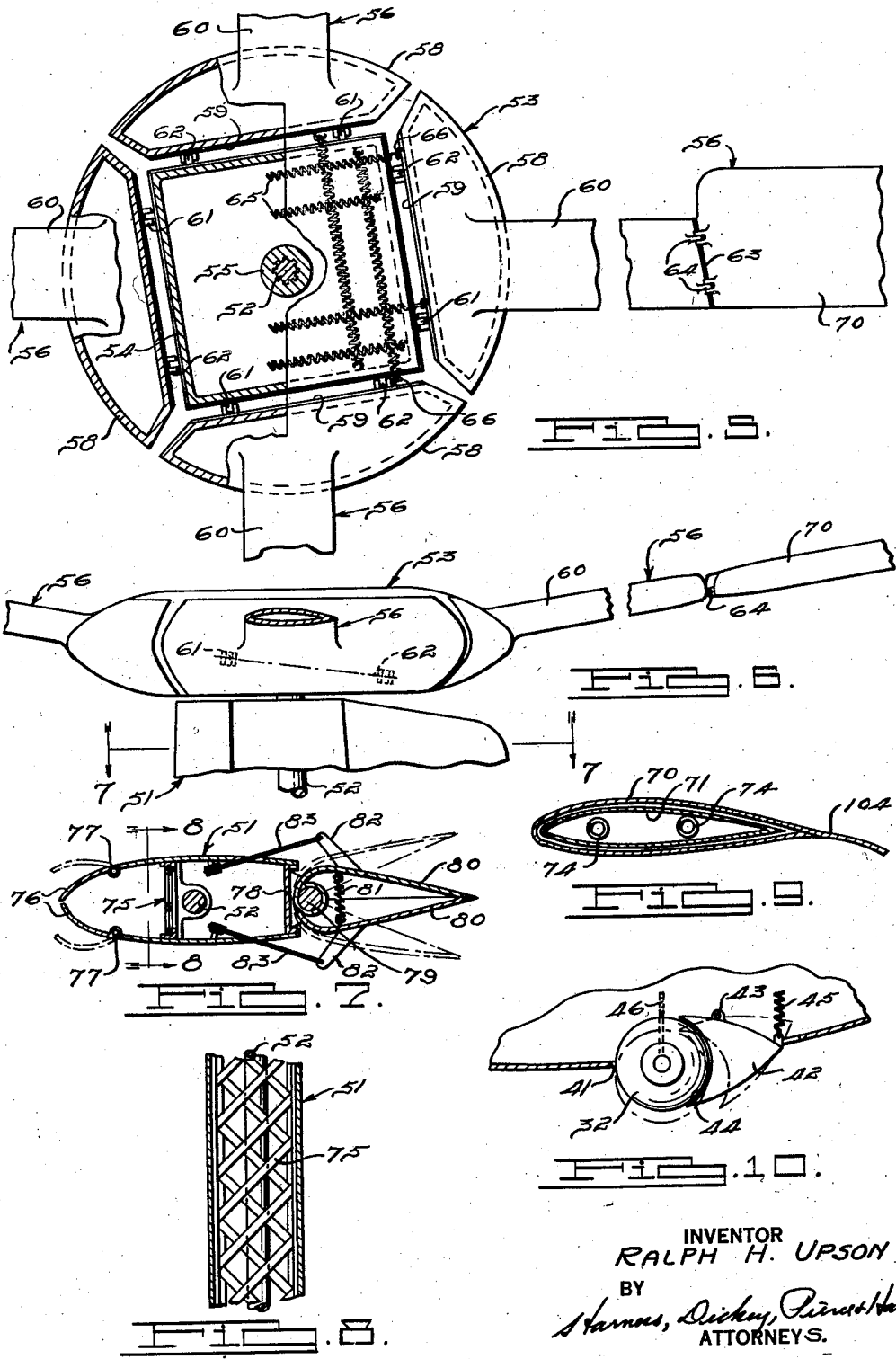

Patented Nov. 19, 1935

2,021,470

UNITED STATES PATENT OFFICE

REISSUED

2,021,470

AIRCRAFT

Ralph H. Upson, Ann Arbor, Mich.

JAN 23 1945

Application May 13, 1931, Serial No. 536,998
Renewed October 6, 1934

28 Claims. (Cl. 244—19)

This invention relates to aircraft, and in certain respects to heavier-than-air craft regardless of the type thereof, and in connection with such respects it is an object of the present invention to provide an improved retractable landing gear; to provide a novel form of control mechanism; to provide a novel form of airfoil; to provide a novel engine cooling system, and improvements in rotors, including propellers, as well as other details of construction which will be specifically pointed out or will be apparent in the following specification.

The invention further relates to aircraft with rotating wings, otherwise called gyroplanes (including helicopters), but more specifically relating to a type with freely rotating wings, called autogiros, and still more specifically to the type in which the main rotor, though wind driven in normal flight, may be clutched to the engine for starting or other special purposes.

The present invention includes as one of the main objects a novel arrangement of parts designed for the primary purpose of securing a feasible and convenient means of folding the wings or blades of a gyroplane, for stowage in a relatively small space. The development of this feature, however, has involved several incidental improvements which, as will be seen, contribute as well to the safety, comfort, lightness and general efficiency of the aircraft, and some of which may be applied to other types such as airplanes with fixed wings.

Other objects of the present invention are, to provide a rotor construction for autogiros which will permit the effective normal diameter thereof to be automatically decreased for stowage purposes; to provide a rotor blade built up in sections; to provide a rotor blade including sections slidable relative to each other; to provide a rotor blade including sections hingedly secured together; to provide a rotor blade in which certain portions thereof are slidable relative to each other and other portions thereof are pivoted relative to each other; to provide a rotor in which the blades are hinged at their root, to a hub member, and in which the axis of each hinge is skewed with respect to a plane perpendicular to the length of the corresponding blade and to the axis of rotation of the rotor; to provide a rotor blade including a pair of hinged sections and in which the pivotal line of the hinge is skewed with respect to a plane perpendicular to the length of the blade; to provide a rotor blade having variable pitch; to provide a rotor blade having a flexible trailing edge and an airfoil with a novel form of flexible trailing edge; and to provide a rotor blade having a trailing edge flap.

Other objects of the present invention are, to provide means for simultaneously controlling the pitch of the rotor blades of a gyroplane; to provide means for effecting a variation of pitch of a blade at one part of the rotor with respect to that at another part of the rotor; to provide means whereby the pitch of rotor blades may be varied during each revolution; and to provide means whereby flaps located at the trailing edge of rotor blades may be oscillated, within predetermined limits, during each rotation of the rotor.

Other objects of the present invention are to provide a new and novel form of hub structure for the rotors of gyroplanes; and to provide a new and novel means of securing the rotor blades to such hub structure.

Other objects of the present invention are, to provide a novel form of rudder for aircraft; to provide a rudder construction for aircraft which may be employed for aerodynamic braking effects; to provide a novel form of mast for gyroplanes; to provide a mast for gyroplanes serving as an airduct for engine cooling purposes; and to provide a mast of the type described provided with shutter mechanism for controlling the flow of air to the engine.

Other objects are to provide a novel form of control surfaces for gyroplanes and other aircraft; to provide a pair of control surfaces at the forward end thereof, serving as auxiliary supporting surfaces; position such surfaces at a substantial dihedral angle; to provide movable control surfaces serving as combined elevators, ailerons and rudders; to provide auxiliary control surfaces inter-connected with the main control surfaces; to provide means for controlling such auxiliary control surfaces whereby they may be employed as the motive power for moving the main control surfaces; and to provide a control surface of an aircraft with guard means for the propeller thereof.

Further objects of the present invention are to provide a gyroplane having a minimum amount of fixed supporting and control surfaces; to provide a gyroplane in which means are provided for controlling the rotor blade for the purpose of controlling the gyroplane in flight; and to provide a gyroplane including certain novel features of construction and arrangements of parts cooperating as a whole to provide an improved aircraft of a novel and distinct character.

The above being among the objects of the present invention, the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a plan view of my improved gyroplane, a fragment only of two of the rotor blades being shown and the remaining rotor blades being partially broken away to illustrate the springs enclosed thereby, the blades being shown extended.

Fig. 2 is a side elevational view of the gyroplane shown in Fig. 1, the blades being shown in rested position.

Fig. 3 is a front elevational view of the gyroplane shown in Figs. 1 and 2, the rotor being turned 45° from that in Fig. 2.

Fig. 4 is an enlarged fragmentary partially broken view of one of the rotor blades, showing the details of construction thereof.

Fig. 5 is an enlarged partially broken plan view of the rotor hub member, illustrating the means for mounting the blades thereon, and showing the construction of the root ends of such blades.

Fig. 6 is an enlarged side elevational view of the construction shown in Fig. 5, and a fragment of the supporting mast being shown in operative relationship with respect thereto.

Fig. 7 is a horizontal sectional view taken through the supporting mast as on the line 7—7 of Fig. 6.

Fig. 8 is a vertical sectional view of a fragment of the supporting mast taken as on the line 8—8 of Fig. 7.

Fig. 9 is a transverse sectional view taken through one of the rotor blades as on the line 9—9 of Fig. 4, also showing the section shape of the main control surfaces in Figs. 1 to 3.

Fig. 10 is an enlarged fragmentary horizontal sectional view taken as on the line 10—10 of Fig. 2, and illustrating the position of one of the landing wheels when in inoperative position, and the relation of the stream-lined fairing with respect thereto.

Fig. 11 is an enlarged fragmentary horizontal sectional view taken through a modified form of hub and blade construction for the rotor, as on the line 11—11 of Fig. 12.

Fig. 12 is a fragmentary partially broken side elevational view of the modified form of rotor shown in Fig. 11.

Fig. 13 is a transverse sectional view taken through one of the blades of the modified form of rotor shown in Figs. 11 and 12, as on the line 13—13 of Fig. 11.

Fig. 14 is a fragmentary sectional view taken on the line 14—14 of Fig. 12, and illustrating the skewing of the pivotal connection for the blade of the rotor at the hub.

Fig. 15 is a more or less diagrammatic side elevational view of the control mechanism for the type of rotor illustrated in Figs. 11 and 12.

Fig. 16 is a horizontal sectional view taken as on the line 16—16 of Fig. 15.

Fig. 17 is a more-or-less diagrammatic, partially broken view of a modified form of control means for the pitch of the rotor blades.

Figs. 18 and 19 are sectional views taken transversely through modified forms of rotor blades.

Fig. 20 is a sectional view taken transversely through a forward control surface of the gyroplane, as on the line 20—20 of Fig. 1.

Fig. 21 is a view similar to Fig. 20 but showing a modified form of construction.

Fig. 22 is a diagrammatic view showing in horizontal section a fragment of the rotor mast and cooperating rudder, and in perspective view the control mechanism for such rudder.

Fig. 23 is a plan view of a gyroplane having a modified form of rotor.

Figs. 24 and 25 are sectional views of the rotor blades in Fig. 23, taken respectively on the lines 24—24 and 25—25 of such figure.

The blades of an autogiro would seem to be particularly adaptable for folding, except for several serious difficulties. If the outer parts of the blades hinged downward they would tend to strike the tail or wings when starting or stopping. If they hinged upward they would tend toward an excess upward angle in flight, due to the fact that the effective center of centrifugal effort of the blade normally lies closer to the center of the circle than the blade center of pressure. Hence, if hinges are used at all, it would ordinarily be necessary to clamp each one in position before starting the rotor, and unclamp it again when ready to fold, which operation would have to be multiplied by the number of joints per blade and by the number of blades, usually four in number. Furthermore, owing to the fact that comparatively large fixed wings and tail length have been found necessary for proper control of present types, a folding blade feature would not be of great advantage unless the fixed wings and tail could also be folded. Hence an important part of the present invention deals with methods of improving the stability and control by use of the rotor blades themselves, whereby the present large control surfaces may be much reduced or even possibly eliminated.

The arrangement covered in the present invention permits feasible use not merely of folding blades, but of automatically folding blades, which in the preferred embodiment require no effort whatever on the part of the pilot except to turn the rotor if desired to a 45 degree blade position, which is naturally the angle of minimum total width for a four blade system. In this way an aircraft span of 44 feet, as shown in the accompanying drawings, will immediately be reduced to 14 feet on stopping, which in itself is a big advantage besides the other advantages incidentally accruing, as will be duly set forth in this application. In order to achieve the desired degree of compactness without unnecessary interference of parts, I employ a telescopic principle of folding for a section constituting the outer portion of each blade, normally comprising something less than one-third of the total length. This section telescopes inside of the next section, where it is preferably held against extension by spring means which exert a force only a little more than sufficient to sustain the weight of said outer section.

The second section could similarly be made to telescope into the base section except for certain practical difficulties of accommodating additional spring means. Also, the base section being relatively ineffective for lift, it is preferably made smaller instead of larger than the middle section. Accordingly, I prefer to hinge the base section to the second section, which materially reduces the local bending moments in flight and also at rest on the ground. A hinge placed at the outer end of the base section does not offer the disadvantage of a hinge further out because there is plenty of mass still outside to confine the flexure to a reasonable angle during flight. Also the position of the hinge just beyond the propeller provides protection for the propeller in case of the outer portions of the blades being carried down by a severe downward gust of wind, the base sections being definitely stopped against moving appreciably below the horizontal. The middle section may be similarly stopped against excessive upward movement. A spring means is employed to hold the blades up at a substantial angle above the horizontal, effective when the rotor is at rest or turning slowly.

Even with this improved mechanism of folding, it is still difficult to take proper advantage of it, due to interferences from other parts of the aircraft, as before mentioned. Also, from a safety standpoint, it is felt that there must be some insurance against the blade tips extending prematurely when the rotor is started, thereby endangering bystanders on the ground as well as the danger of breakage to the blades themselves. Both these conditions are largely met by the manner in which the blades are hinged and supported at the root, which in turn is facilitated by the reduced moments near the root, as above noted. In the first place, the mounting must be sufficiently high for clearance purposes, especially with the large, geared-down propeller which is highly desirable for this type of aircraft. The resulting disadvantage of increased parasite drag is minimized and even turned to account by fairing all the hinges and other gear at the top into a rotating streamline housing, and making a fin surface out of the support. The latter would be of little or no value for directional stability in the present tractor type of autogiro where the axis of rotation of the rotor passes very nearly through the center of gravity of the aircraft; and it would also interfere with the seating accommodations. By using a pusher arrangement, however, with the front elevator as shown in the drawings this fin may be put behind all chance of interference with the passengers and also sufficiently behind the center of gravity so that it is of substantial effect in a direction sense.

For the actual blade mounting it must be understood that the form in present use consists essentially of a universal joint comprising a hinge perpendicular to the rotor axis and to the blade length, permitting movement in a plane passing through the axis of rotation of the rotor, and another hinge perpendicular to the first hinge and parallel to the rotor axis, permitting a small degree of motion of the blade in a plane perpendicular to said axis of rotation.

The principal reason why the present autogiro requires such extensive control surfaces is because of a peculiar form of instability resulting from the blade rotation and the method of mounting now used. The conventional articulated mounting above described is for the primary purpose of equalizing the lift on the two sides of the rotor because if the blades were rigid there would naturally be more lift on the advancing blades than on the retreating ones. The articulation permits a movement of the blades under the influence of their centrifugal force by which the advancing blades, generally speaking, are moving up in a plane through the rotor axis and on the retreating side they are similarly moving down; but there are also two other factors to be considered here namely, the so called coning angle of the blades, and the longitudinal distribution of the induced air-flow which cause the blades in the front to get more air pressure than those behind. This is an eccentric influence on what would otherwise be a nearly symmetrical distribution of motion, and results in the blades reaching their highest and lowest points not at the front and back respectively, but beyond and to one side. In turn this influence brings a rolling moment on the aircraft in an opposite direction to what would be obtained by using a rigid system of blades.

In other words, in the present form of rotor, the original dissymmetry in lift (as of a rigid rotor) is over-corrected; and, not only that, but similar causes also result in a form of instability, similar in effect to gyroscopic action, by which a rolling or pitching motion in any one direction does not set up much of a damping force to oppose such motion, but rather tends to force a motion in an entirely different direction. This can be corrected by appropriately varying the angle of pitch of the blades, with reference to the forces and motions to which they are subject. Before resorting to novel mechanical means, however, I prefer to utilize as far as possible the qualities contributed merely by a proper choice of hinge angle, as above mentioned. Thus I mount the main root hinge of each blade, and also the hinge at the outer end of the base section, at a special skew angle, such that when the blade drops, it tends simultaneously to move slightly forward and at the same time assume an increasing angle of attack. This incidentally serves the function of the present vertical hinge to a large extent so that it may usually be dispensed with.

The dependence of the pitch on the vertical position of the blade still retains too much of the inertia factor, however, so that the best effect on stability is obtained by combining this vertical yielding of the entire blade with a yielding or otherwise variable trailing edge, which in this case is employed for the middle section of each blade. The airfoil constituting the blade section here consists of two parts, a relatively thick hollow portion occupying roughly two-thirds to three-quarters of the total width and yielding trailing edge for the remainder of the surface. This is done either by making the trailing edge as a hinged flap, with a separate spring connection, if desired to supplement the centrifugal force, or by making the trailing edge itself elastically flexible relative to the forward part of the airfoil. In the latter case the trailing edge is preferably made with a single covering surface, with or without ribs. In either case the trailing edge is made concave downward, this feature being particularly important at the extreme rear.

With this construction it is apparent that the flexible portion will yield upwardly when increasingly subjected to pressure from below. Owing to the curvature this action takes place not only in response to a sudden change in the angle of attack but also with increase in the relative speed even with the same angle of attack. Both of these effects in proper proportion are desirable for attaining the aforementioned advantages and this feature is particularly helpful in combination with the hinge arrangement already described.

It will be seen that there is a practical limit to the amount of change in the pitch angle that may be accomplished by the skew hinge method, for the reason already noted, that an increasing amount of such action progressively increases the dissymmetry of lift on the two sides of the rotor once the symmetrical condition has been passed. This is due to the fact that the entire mass of the blade must be carried upward in order to change its angle of attack. The flexible trailing edge just described, however, is so light that it responds almost instantaneously to any change in the surrounding aerodynamic conditions. Hence its employment in combination with the other gives a means of substantially increasing the range of blade characteristics which may be desirable to fit a similarly large range of desired performance.

Generally speaking, this type of trailing edge tends to smooth out irregularities in the lift whatever their original cause may be.

The same general type of trailing edge may be used to advantage on the main control surfaces. Here the reaction of increasing speed on the downwardly curled rear edge forces the flexible portion further up, which in turn allows the surface as a whole to assume a larger angle of attack thus facilitating stability. The application of this feature to more conventional types of aircraft may involve the use of an upward instead of a downward curl, as on an ordinary tail surface elevator. Its application to power driven types of rotors, including propellers, requires generally that the curl be concave toward the suction side of the blade.

There are several specific advantages in an autogiro rotor possessing a combination of the above blade features as shown in Figs. 1 to 4. When the improved rotor is at rest each base section of the blades is held by the supporting springs at a considerable upward angle, which induces a small pitch angle in this section. The next section, which hangs down, has a large pitch angle due both to the setting of the hinge and to the initial undeflected position of the trailing edge. This tends to force the outer blade sections rapidly outward and upward on starting the rotor. If the blades should subsequently tend to pull down too far, the angle of attack will automatically increase, thus restricting the downward movement.

In flight, if for any reason such as a severe and protracted downward gust, the load should be taken off of the blades sufficiently to cause a serious retardation of the rotor, as soon as the load is again applied, the coning angle will automatically be increased and the trailing forced up, thus reducing the pitch angle of the blades and tending toward their rapid acceleration back to a normal speed of rotation. The immediate effect of a vertical gust, however, is to change the blade pitch in a direction to relieve rather than to oppose the force of such gust, thus improving the comfort and decreasing stresses in rough air without as much actual change in the coning angle as would occur in one of the present type autogiros. In fact, for any given flight condition the total vertical range of blade movement is reduced due to the direct yielding of the trailing edges as well as to the vertical yielding of the blades' vertical position which in itself produces a corresponding change in pitch. This promotes generally improved smoothness of action and also improved stability of the aircraft as a whole, or rather more nearly neutral stability, with less tendency to erratic behavior, and with better all-round efficiency and susceptibility to control.

Due largely to the above improvements, I have found it possible to establish complete control in all directions through the medium of a single pair of front control surfaces with preferably a supplementary pair of small pilot or servo surfaces located toward the rear. The main surfaces are placed at a very considerable dihedral angle and also have normally a positive forward angle of attack. Operation of the controls to effect a simultaneous change in the angle of attack of both these surfaces controls the aircraft in pitch, and an opposing movement of the same two surfaces takes care of both banking and turning, this being all accomplished by a conventional joy stick or column with wheel.

The pilot surfaces in the rear though applicable to any type of aircraft with front elevators, are specially desirable in this case, due to the very large change in angle of attack which is permissible with a gyroplane. The primary purpose of these small surfaces is not so much to provide force for operating the main surfaces as to maintain them at the desired effective angle of attack to assure the proper combination of stability with adequate control at all times.

In order to permit special maneuvers, the rear part of the fin supporting the rotor is articulated to form a split rudder, which by alternate movement of the usual foot pedals, may be turned as a unit in either direction or, by forcing down both pedals, simultaneously opens to form an aerodynamic brake, both operations being preferably inter-connected and combined with the wheel brake operation as will be described with reference to the drawings. The front of the same supporting fin is utilized to carry cooling air to the engine.

This arrangement of parts also frees the main landing wheels of usual interferences so that they may be readily made retractable, even though an unusually long shock absorber travel is employed. It also permits a very desirable arrangement of useful load whereby the pilot has exceptionally good vision, and all passengers have easy access and substantially unobstructed view. Also, the variable weight of passengers, fuel, and baggage comes very close to the center of gravity so as not to seriously disturb the trim. Furthermore, the placing of the main wheels slightly behind the center of gravity and a third wheel forward prevents all possibility of nosing over in a landing, thus making it possible to land the craft fast as well as slow without the danger that exists at the present time. This can of course be done with tractor aircraft also, but not as effectively or as conveniently.

Other advantages, more commonly associated with pusher airplanes, are of course also realized or even enhanced. These include the added stability provided by the large pusher propeller; the reduced noise, vibration and wind; the freedom from fumes and oil spray, and the almost complete protection that is possible in case the engine catches fire in flight.

Thus, although there is nothing essentially new in the idea of a pusher aircraft, it is believed that its application to the gyroplane is new, particularly in conjunction with the other features herein described, which specifically result in a much more compact aircraft automatically folding into a small space and at the same time showing the other substantial improvements mentioned.

We must now consider two disadvantages of the pusher arrangement; namely, that when the propeller is located behind the control surfaces, the latter are not so effective at slow speed, and it is difficult to utilize the slip stream for the purpose of keeping the rotor going while the craft is at rest on the ground in practically no wind. With a clutch connection to the rotor, however, such as has already been successfully utilized, particularly with a variable pitch propeller, the latter disadvantage is partially removed; and both may be practically eliminated by a further modification of my invention by which the pitch of the rotor blades theselves is put under the direct control of the pilot, with other incidental advantages, particularly in combination with the features already described.

Two serious difficulties of trying to control a gyroplane by means of the blade pitch are; first, the dissymmetry in lift and the indirectness of its reaction to applied forces; and, second, the danger of flutter due to insecurity of attachment of the blades in torque. Basing the construction, however, on the method of automatically varying the pitch to give normally balanced forces around the disc, the control can be based on an initial condition essentially neutral; then instead of trying to control the angle of the entire blade I change the angle of the trailing edge alone, which leaves the main part of the blade a structural unit. As both of these methods have already been described in their fundamentals, the further modification of construction necessary to effect manual control is now comparatively straightforward. The mechanical connection for this purpose will be hereafter understood by reference to the drawings.

I wish to point out here that, owing to characteristics already mentioned, a change in the blade pitch on one side of the rotor does not control the rotation of the aircraft in that direction, but in a direction substantially at right angles thereto, and this feature is of course taken into account in the construction shown. By this method, the usual joy stick is provided in addition with a wheel at its top, mounted so that it may be turned on the stick as an axis, but otherwise mounted rigidly with the stick. Pushing forward or back controls the changes of blade pitch at the sides, which in turn affects the longitudinal angle of the blades in a manner to control the entire craft with respect to pitching movements. In the same way, side tilting of the stick in aerodynamic coordination with the fin surface, controls banking and turning. Turning the wheel around to the right, which happens to be the direction of rotation of the blades, decreases their pitch, increases their speed of rotation, and, generally speaking, increases the rate of decent of the aircraft. Reversing the motion of the wheel slows up the speed of rotation by increasing the pitch of the blades and also slows up the speed of decent down to a point corresponding with the minimum sinking speed. If the wheel continues to be turned counterclockwise, it eventually tightens up on the rotor brake cable, which positively brings the rotor to a stop and holds it.

Before starting the rotor by clutching into the engine, the rotor brake is first relieved, but the blade flaps are held at a large angle of attack in order to hold the blades up as high as possible for additional ground clearance until a substantial speed of rotation is attained. Then the rotational speed can be progressively increased by decreasing the pitch angle. The latter need not be increased to the normal value again until the moment of take-off. In descending, the blades can be set as desired for flattest or steepest glide, minimum or maximum sinking speed, and a quick check of sinking speed when immediately approaching the ground.

Thus by the use of automatically and manually controllable blades the original object of producing a more compact type of aircraft is further served by the possibility of doing away with elevators and ailerons entirely. Also by the better control of sinking speed thus afforded, the actual size of the rotor itself may be proportionately decreased, or designed to serve more efficiently the other flight characteristics desired.

Altho the drawings show the rotor with the usual four blades, it must not be supposed that this has anything to do with the main features of my invention, which could be applied to almost any number of blades. For certain purposes however there is a material saving in weight and drag by using fewer blades, which is facilitated by the improved smoothness of action and control afforded by the improvements above described.

As indicated in Figs. 1, 2 and 3 my gyroplane is provided with a cabin type of fuselage 30 of suitably streamlined formation. For the purpose of supporting the fuselage from the ground I provide it with a single forward wheel 31 and a pair of transversely spaced rear wheels 32. The front wheel 31 is rotatably carried on the end of a link member 33 which in turn is pivoted about an approximately vertical line to a strut member 34 pivoted about a horizontal axis as at 35 to the forward end of the fuselage 30. A conventional compression type of shock absorber 36 yieldably resists upward pivotal movement of the strut 34.

On account of the aforementioned improvements in the rotor, permitting a simplified control system, I do not employ fixed wings of a character suitable to serve as a mounting for the two main landing wheels. Instead each rear wheel 32 is pivotally mounted on the outer end of a strut member 37 which normally extends inwardly and upwardly therefrom and is pivoted to the fuselage as at 38. A web or fairing 39 is fixed to each of the links 37 and a conventional compression type of shock absorber 40 is connected between the web 39 and the upper portion of the fuselage 30. The axes of the pivotal connections 38 are in a horizontal plane and extend longitudinally of the fuselage 30 and the wheels 32 may accordingly be swung upwardly about these axes and into pockets 41 provided in the sides of the fuselage 30 to receive them.

As best indicated in Fig. 10 the rear portion of each of the pockets 41 is provided with a fairing member 42 pivoted to the fuselage as at 43. The forward face of each of the fairing members 42 is curved as at 44 to provide a socket for the corresponding portion of the periphery of the corresponding wheel 32, and a spring 45 is provided which constantly urges the tail of the member 42 inwardly of the fuselage. When the wheels 32 are retracted in the pockets 41, which may be accomplished, for instance, by cables such as 46 connected with each of the struts 37 and leading to a drum (not shown) located within the fuselage in accordance with conventional practice, the wheel engages the curved socket portion 44 of the corresponding member 42 and causes the same to rotate about its pivot 43 to the position indicated in Fig. 10, thus placing the spring 45 under tension. Accordingly, the tension of the springs 45 acting to rotate the members 42 constantly urges the wheels 32, when in retracted position, out of their respective pockets 41. As a result of this construction as soon as the catch holding the cable 46 in its retracted position is released, the springs 45 acting through the members 42 will force the wheels 42 out of the pockets 41, and thus aid in a quick return to landing position.

The wheels 32 are positioned a slight distance rearwardly of the center of gravity of the gyroplane, and the front wheel 31, being positioned at a maximum distance ahead of the center of gravity, it will be apparent that any tendency of the plane to nose over in landing, or to somersault when running along the ground, is substantially prevented. Any damage to the plane, due to poor landing or other conditions wherein the front wheel 31 is lifted from the ground before or contacts with the ground after the rear wheels 32, is effectively prevented by the provision of a tail skid 47 at the rear end of the fuselage.

Rigidly secured to the fuselage 30 centrally of the sides thereof and in approximate alignment longitudinally of the plane with the center of gravity thereof is the vertically extending mast indicated generally in the figures as at 51. The specific details of construction of this mast will be more fully described hereinafter, but for the present it will be sufficient to understand that a vertically extending shaft 52 extends through the mast 51 and projects above and below the same.

To that end of the shaft 52 projecting above the mast 51 is non-rotatably secured a lenticular rotor hub member, indicated generally throughout the various views as at 53. In the specific construction of this hub member 53 illustrated in Figures 1 to 6 inclusive, and as best indicated in Figures 5 and 6, it comprises a central hollow member 54 having a hub 55 keyed or otherwise non-rotatably secured to the shaft 52. The outer side surfaces of the member 54 are formed to provide as many flat surfaces as there are blades employed for the rotor. In the specific case shown the rotor is provided with four equally spaced blades which are indicated generally as at 56, and consequently the member 54 is square in plan view. Hollow members 58 of generally segmental shape are arranged around the member 54 and cooperate therewith to complete the lenticular formation of the hub member 53. The members 58 are each provided with a flat inner face 59 in spaced but adjacent relationship with respect to the corresponding flat side face of the member 54, and the ends of the members 58 are flattened off so that their adjacent ends lie in spaced but adjacent relationship. Suitable fairing (not shown) may be provided for closing the gaps between the members 58 and 54 where such closure is desired.

The members 58 constitute the root of the corresponding rotor blades 56, and each has integrally secured thereto a relatively short shank portion 60 for the corresponding blade 56, the shank portions 60 being in substantial alignment with the longitudinal axes of the corresponding blades 56 and preferably being of airfoil section as indicated in Figure 6.

Although the direction of rotation of the rotor may be either clockwise or counter-clockwise in plan view, the specific embodiment shown in the drawing includes the rotor turning in a clockwise direction as viewed from above. Each of the members 58 is pivotally secured to the adjacent face of the member 54 by a pair of hinges 61 and 62, the hinges 61 being located in advance of the hinges 62 relative to the direction of rotation of the rotor. In accordance with the present invention the longitudinal axes of each of the blades 56, as best indicated in Fig. 5, does not extend perpendicularly with respect to the axial line of its corresponding hinges 61 and 62 but instead is skewed with respect to such perpendicular line in a direction toward the direction of rotation of the rotor. In other words the tip of each blade is advanced in the direction of rotation relative to a line perpendicular to the axial line of the corresponding hinges, or stated in another way, the pivotal connection between each blade and its hub is skewed with respect to a plane perpendicular to the longitudinal axis of the blade.

In addition, the hinge 61 for each of the blades is located above the corresponding hinge 62, with respect to a plane perpendicular to the axis of the shaft 52 as shown better in Fig. 6. In other words, the pivotal connection between each of the rotor blades and its hub is skewed with respect to a plane perpendicular to the axis of the shaft 52, and in a direction such that upward movement of the outer end of each of the rotor blades must necessarily be accompanied by a corresponding movement of the rotor blade in a direction opposite to the direction of rotation of the rotor. This skewing of the pivotal connection between the rotor blade and the hub combine to effect the following result. The first mentioned skewing, namely, that of the pivotal axis relative to a plane perpendicular to the longitudinal axis of the blade, tends to decrease the effective pitch of a blade when said blade moves upwardly relative to its normal coning angle, at the same time causing it to advance slightly with respect to its normal position in the rotor. The above motion occurs on the advancing side of the rotor where the decreasing pitch is desirable, but where, on the other hand it is better to have a lagging movement against the direction of rotation, rather than an increasing one. The latter effect therefore is neutralized or even reversed by a proper choice of skew angle relative to a plane perpendicular to the rotor axis as already described. Thus with the construction herein disclosed those rotor blades advancing against the direction of movement of the plane will, in moving upwardly in response to the reaction of the air flowing agaisnt them, not only be retarded relative to the normal speed of rotation of the rotor, but their effective pitch will be reduced, thus tending to reduce the effective lift of the advancing blades as compared to those in conventional constructions. Conversely, the blades on the retreating side of the rotor relative to the direction of the movement of the plane will, in moving downwardly due to the reduction of air pressure against them, not only advance in even greater degree with respect to the relative rate of rotation of the rotor, but the effective pitch of the same will be increased, thus effecting an increased lift from these blades as compared to those in conventional construction. The more uniform blade forces resulting from the above action serve to reduce the vertical movement of the blades, at the same time shifting the highest and lowest points reached per revolution in a direction against that of the blade rotation, producing a generally smoother motion, and reducing the dynamic instability as already mentioned.

This compensation in the lift of the rotor blades as compared to conventional constructions may also be furthered by introducing a similar skew angle in a second hinge joint located outwardly from the root of the blade relative to the hinge joint already described. Such a construction is indicated in the drawing by the provision of a break 63 in each rotor blade 56 between the tip and the root of each blade, and hinging the two parts of the blade formed by such break together by means of hinges 64, the pivotal axes of which are located in approximately parallel relationship with respect to the pivotal axes of the hinges 61 and 62 for the corresponding blades. Although in this case the principal movement in flight is still in the root hinges, the outer ones furnish a quicker response to suddenly applied forces. The particular location of the break 63 in the blade may be varied, in accordance with the broader aspects of the present invention, in respect to its location longitudinally of the blade, and although it may be located anywhere between the root and the tip of the blade I have shown it in the drawings as being substantially one-third the length of the blade out from the root, this being for the primary purpose of realizing certain further advantages which will hereinafter be described.

Coil springs 65, tensioned between hooks 66 secured to opposed segments 58 above the line of pivotal connection of such segments to the member 54, constantly urge the segments 58 towards upward movement about such lines of pivot. The force of these springs 65 are preferably such that when the rotor blades are at rest, at which time they are not subjected to centrifugal force, they will actually cause the segments 58 and blades carried thereby to cone upwardly at a material angle as indicated in Figures 2 and 3, thus not only decreasing the minimum effective width of the rotor for storage purposes, but also lifting the folding blade portions, when employed, away from possible contact with the ground or parts of the gyroplane. When the blades are in such upwardly biased position, and folding blade ends are employed, hooks or like members such as 67 may be provided on the fuselage 30 for the purpose of running a line such as 68 between them and the tips of the rotor blades to secure them against movement when not operating.

In order to realize such further advantages in accordance with the present invention I form that portion of each rotor blade 56 outwardly of the break 63 into two sections, namely, an intermediate section 70 and an outer section 71. As best illustrated in Figures 4 and 9, the intermediate section 70 is of hollow construction, its outer end being open and being provided with a collar portion 72 within which the outer section 71 is slidably received. The outer section 71, which is preferably of substantially the same length as the intermediate section 70, may thus slide into the intermediate section 70 until substantially fully received therein. For the purpose of limiting the outward movement of the outer section 71 relative to the intermediate section 70, the outer section 71 at its inner end is provided with an outwardly extending flange 73, best shown in Figure 4, which contacts with the inner end of the sleeve portion 72 of the intermediate section when the outer section 71 has been moved to its extreme outward position relative thereto.

For the purpose of constantly urging the outer section 71 of each rotor blade into telescoping relationship with respect to its corresponding intermediate section 70, one or more tension springs 74 are stretched between the tip of the outer section 71 and the inner end of the intermediate section 70 as illustrated in Figure 4. The force exerted by these springs 74 is preferably such as to be able to draw the outer section 71 into fully telescoping relationship with respect to the intermediate section 70 when the sections 70 and 71 are hanging in a vertical direction with the tips of the outer section 71 at the bottom, and the rotor is at rest. In such a case whenever the rotor stops turning and the intermediate section 70 folds downwardly about the hinges 64, under the influence of gravity, the outer section 71 will automatically be retracted into the intermediate section 70 as illustrated in Figures 2, 3 and 4. On the other hand, as soon as the rotor begins to rotate at an appreciable speed, the centrifugal force acting upon the outer section 71 of the rotor blade will be sufficient to overcome the tension of the springs 74 and permit the inner section 71 to move to fully projected relation with respect to its corresponding intermediate section, thus providing the maximum amount of effective blade area for flight.

In connection with the provision of the second hinge joint 64 for each of the rotor blades it will be apparent, as previously described, that the introduction of an additional joint or joints in the length of the rotor will have the effect of reducing the intensity of the bending moments to which the blade sections are subjected to in flight, as compared to a rotor blade in which such additional joints are not provided, and this permits the blades themselves to be constructed in a considerably lighter manner than in those cases where each blade is formed as an integral structure.

It may be here noted that by the provision of rotor blades having hinged and telescoping sections as above described, it is possible, by arranging the rotor with its blades diagonal with respect to the longitudinal axis of the craft when at rest, to reduce the effective rotor width to a minimum. This effect, when coupled with a design of fixed control surfaces of no greater effective width, as particularly illustrated in Fig. 3, permits the plane to be stored in a space of minimum width, an important feature in connection with the question of suitable hangar facilities. Moreover, this effect may be carried out still further by arranging the blades in unequally spaced angular relation as particularly shown in Fig. 23.

The structural mounting 51 for the rotor is combined with other necessary functions of the aircraft as a whole in the manner shown in Figures 6, 7, 8 and 22. This part of the structure is made essentially of three parts, all being streamlined together to form a section of substantially minimum drag. The central portion thereof is a strong, rigid structure, particularly with respect to the main reinforcing web 75 which carries the bearings for the rotor shaft 52. Forward of this web member, constituting the leading edge of the section, are two hinged flaps 76 attached to shafts 77 by means of which their position may be controlled as between the two extremes shown in Figure 7 or for any desired intermediate position. This adjustment controls the amount of air delivered to the engine for cooling purposes, the air flow being indicated by the arrows in Figure 2.

In order to utilize the sectional capacity of both of the two forward portions of the supporting fin section, the web member 75 is made of an open, lattice structure through which the air may flow freely. The rest of the skin, however, is made substantially tight including the rear web 78. This carries a hinge element 79 to which is pivoted the rear portion of the fin section, which in turn is preferably made in two laterally disposed symmetrical sections 80. Within these sections a spring 81 under initial tension tends always to draw the two aforesaid sections into mutual contact with each other. By means of horns 82 and cables 83 attached thereto, these two sections may be pulled apart at the will of the pilot to serve as an aerodynamic braking means, or if desired they may be moved simultaneously in the manner of a rudder to one side or the other.

Figure 22 shows a modification of the same idea whereby two hinged elements 79a are employed instead of one. A preferred means of operation is shown below in the same figure comprising two more or less conventional foot pedals 84 which may be pushed either simultaneously to get the braking effect or alternately to get the rudder type of action, as already mentioned. This fin structure as a whole, including the rudder, due to its longitudinal position near the center of gravity of the aircraft, has more effect on the lateral attitude of the craft than on its directional attitude. Thus the use of the flaps 80 is confined to relatively special maneuvers in which a corrective force has to be applied to the normal operation of the main controls which will now be described.

These, in respect to the direct action involved, are confined to a single pair of combination elevators and aileron surfaces 90 located at the front of the car, as shown in Figures 1, 2 and 3. These main surfaces take their position in respect to the force applied by two relatively small pilot surfaces 91 at the rear of the car. The pilot surfaces in turn are actuated by the relative air pressure impinging upon them in flight. This is automatically varied by the attitude of the car and of the aircraft as a whole relative to the flight path but it may also be controlled at the will of the pilot by arbitrarily changing the angle of attack directly of the surfaces 91. To provide for this each of said pilot surfaces is pivoted at 92 to the rear end of an arm 93, which in turn is pivoted to the car at 94 where it carries with it, mounted rigidly, a horn 95. The surface 91 also carries a horn 96, mounted rigidly with it, to which is attached a rod 97 pivoted to a horn 98, which in turn is freely pivoted at the point 94 (not rigid with the arm 93). The latter horn 98 is connected to the manual controls. The other horn 95, however, is connected to a horn 99 on the upper face of control surface 90, these linkage elements being crossed, that is, the left hand horn 95 is connected to the right hand horn 99 and vice versa. It will now be readily apparent that if both horns 98 are pulled forward by the action of the pilot the pilot surface 91 will be subjected to a relatively upward aerodynamic force which in turn will decrease or make negative the angle of attack of surfaces 90. The reverse action will take place if horns 98 are both moved back. On the other hand, if the left hand one is pulled forward and the right hand one pushed back, the left hand surface 90 will be caused to assume an increased angle of attack, and the right hand surface 90 a decreased or negative angle of attack. This will create the combination of a rolling movement tending to bank the aircraft up at the left and down on the right, and a turning movement in the proper direction for a turn to the right. With the controls in neutral the surfaces are normally arranged so that the pilot surfaces 91 are carried at a slightly negative angle, that is subjected to a downward air force which in turn places the main surfaces at a slightly positive angle of attack at which the air reaction is upward.

The automatic action is as follows:

Assuming that the manual controls are held in a given position near neutral, suppose that the aircraft receives from some outside source forces tending to pitch it up by the nose, while the movement is still in progress, the main surfaces 90 would by themselves tend merely to track with the relative wind. The pilot surfaces 91, however, receive a relative force from below due to the pitching movement which, acting on the arm 93, pushes the horns 95 forward setting the surfaces 90 in a direction to resist the movement. The same corrective forces come into play if the angle of pitch is assumed to be already changed to a different angle, so that the stability afforded is both dynamic and static in character and by a proper choice of proportions the dynamic and static elements may be varied in proportion to each other. Similar effects take place with respect to the lateral and directional stability.

In connection with the rotor blades and control surfaces, it is deemed advisable at this point to call attention to the fact that the intermediate sections 70 of the rotor blades 56 are of a greater width than the adjacent sections, this being accomplished in the constructions illustrated in Figs. 1 to 9 inclusive by extending the covering of the center or intermediate sections 70 rearwardly to form an extending trailing edge portion 104. This portion of the blade is preferably of such a flexible nature as to be capable of flexing under the influence of the air forces thereon and for the purpose of increasing the stability and controllability of the craft, such portion 104 is preferably normally biased downwardly, particularly at the extreme rear, as best illustrated in Fig. 9. The result of this construction is that normally the blade section has an appreciable camber tending to effect an airfoil section of relatively great lifting capacity. Due to the fact however, that this portion 104 will flex in response to the air forces acting upon it and proportional to the intensity of such forces, it will be apparent that the rear edge 104 in flexing will modify such forces and therefore tend to result in a condition of more constant lifting effort by the blade during all phases of movement, and thereby aid in eliminating the rolling and pitching customary in conventional types of gyroplanes as heretofore constructed. Likewise, it will be apparent that the provision of this flexible trailing edge will have a tendency similar to that obtained by the provision of the skewed hinge sections in the blade in that the rotor blade advancing relative to the direction of travel of the aircraft will be subjected to greater air forces than the blades on the retreating side of the rotor and consequently, the edge 104 in flexing upwardly on the advancing side will act to reduce the effective lift of the blade and when on the retreating side of the rotor, where the air forces are at a minimum, will tend to resume its normally downwardly biased position and therefore act to increase the effective lift.

A similar effect to that above described may be obtained in the manner illustrated in the Fig. 18. In this figure the numeral 70a illustrates the intermediate blade section. The section 70a is provided with a trailing edge section 104a pivotally secured thereto as at 105, the pivotal connection 105 being shown for the purpose of illustration as a shaft. A hairpin type of spring 106 normally tends to maintain the section 104a in its normal position with respect to the section 70a.

The section 104a is illustrated as having its rear edges biased downwardly in the same manner as the section 104 in Fig. 9. This may not be necessary in all cases, however.

A like effect may be realized by the construction illustrated in Fig. 19 in which like numerals refer to the same parts as in Fig. 18 with the exception of the "sub" letter carried thereby. In Fig. 19 the flap 104b is freely hinged to the section 70b by means of the shaft 105b. No spring or other mechanical means is employed to urge the flap 104b toward any specific location. Instead the flap is left to be freely acted upon by the combined forces of gravity and centrifugal action, the latter constituting the main force for consideration in flight. The centrifugal force acting on the flap, in flight, will insure the flap taking a proportionate share of the lifting force of the rotor, yet the flap will be permitted to yield against sudden changes in pressure a sufficient amount to effect the desired result. In connection with this modification it will be apparent that the intensity of the effect of the centrifugal force on the flap may be varied by varying the mass moment of the flap in relation to the air force moment arm, both taken from the hinge line.

A similar effect may also be carried out in connection with control surfaces 90 as best illustrated in Figs. 20 and 21. In this case however, it is preferable that the surfaces 90 have a tendency toward a positive angle of attack, decreasing somewhat with increase of speed, and consequently the flexible rear edges 108 thereof are biased upwardly as illustrated in Fig. 20. These surfaces, however, may be provided with a pivoted trailing edge, as illustrated in Fig. 21, which shows a control surface 90a having a trailing edge section 109 pivotally secured thereto by means of the shaft 110. The trailing edge of the section 109 is shown as being biased upwardly in a manner similar to that shown in Fig. 20. Spring means such as that illustrated in Fig. 18 may be employed in connection with the construction shown in Fig. 21 for normally urging the section 109 in an upward direction, or a spring such as 107 having one or more convolutions extending around the shaft 110 and having its free ends connected respectively to the section 90a and to the flap 109 may be employed to effect a like result.

As previously suggested the advantages derived from the provision of a movable trailing edge for the rotor blade may be carried out still further by the provision of manually controlled means for controlling the movable position of such trailing edges. One form of construction for carrying out this result is illustrated in Figs. 11 to 16 inclusive. In this case, the hub structure indicated generally at 53 throughout the drawings, is of a slightly different construction than that described in connection with the previous figures. In this case, the hub instead of having the hinged portion thereof constituting the complete periphery of the hub, is peripherally notched to accommodate corresponding members. In other words the main portion 115 of the hub, and which is secured against relative rotation to the drive shaft 52', is of circular formation in plan view with the exception of the peripherally notched out portions 116 of a number corresponding with the number of blades employed in connection with the rotor. The member 115 is also provided with a central recess 117 which may be on its lower surface, as best indicated in Fig. 12 for reception of certain parts of the manual control mechanism which will hereinafter be more fully described.

The notched out portions 116 in the member 115 receive therein the complementary shaped hollow members 58' which correspond to the member 58 in the previously described figures. These sections 58' are secured to the main hub portion 115 by hinges 61' and 62' corresponding with the hinges 61 and 62 previously described and correspondingly positioned with respect to the axis of rotation of the rotor and to the longitudinal axis of the corresponding rotor blades. Sections 58' are each provided with shank portions 60' fixed thereto and which in turn are pivotally connected at their outer ends to the inner end of outwardly positioned blade sections 70' by means of hinges 64', all of which parts correspond with and are located in accordance with the similarly numbered parts in the previously described construction. In the present case however the sections 70' of the rotor blade are provided with trailing edge sections 118 pivotally secured thereto along a line in approximate parallelism with respect to the length of the blade, and the line of pivot of which may correspond with, or in other words align with, the trailing edge portion of the corresponding shank portion 60', as best illustrated in Fig. 11. The pivotal mounting for the trailing edge section 118 may include a rod or shaft 119 fixed to the section 118 and journaled in a suitable bearing 120 fixed on the main part of the section 70' as best illustrated in Fig. 11. A correspondingly extending and supported shaft or rod 121, forming an extension of the shaft 119, may be provided along the trailing edge of the shank portion 60' and be connected thereto by means of a universal or equivalent joint indicated generally as at 122, the center of which is disposed in substantial alignment with the hinges 64'.

The inner ends of the shafts 121 are in turn connected by means of a universal joint indicated generally as at 123, and located with its center in substantial alignment with the line of pivot of the hinges 61' and 62', to the outer end of a shaft section 124 whose axis is normally aligned with the axes of the shaft sections 119 and 121 and which is suitably journaled in the member 115. The inner end of the shaft section 124 is fixed to a curved arm 125 lying within the recess 117 and extending around such recess in the direction of rotation of the rotor for a distance of substantially 90 degrees.

The drive shaft 52' substantially within the recess 117 is provided with an axially slidable ball 126, as best shown in Fig. 12. Journaled on the ball 126 for universal movement with respect thereto is a peripherally grooved disc-like member 127.

The free ends of the arms 125 are received and confined within the peripheral groove of the member 127 as clearly indicated in Figures 11 and 12.

Preferably within the fuselage of the plane and disposed in axial alignment with the drive shaft 52 is a threaded shaft 131 rotatably supported by and maintained against relative axial movement between a pair of vertically spaced supporting members 132 and 133. A mechanical interconnection is preferably provided between the shaft 131 and the joy-stick for the plane in such a manner that the rotatable position of the shaft 131 may be controlled by the joy-stick. One satisfactory means of accomplishing this result is illustrated in Fig. 15 which illustrates a joy-stick including two sections 134 and 135 connected together by a universal joint indicated generally as at 136. The section 134 may be rotatably supported in axial movement from a member 137 (which in some cases may be a continuation of the member 133) so that the section 135 is universally movable with respect thereto. The section 135, which corresponds to the conventional joy stick, is preferably provided at its free end with a wheel 138 for the purpose of not only facilitating the control of the universally movable position of the section 135, but further to permit greater ease in rotating the same. The section 134 may be provided with a pulley 139 or equivalent element fixed thereto, and the shaft 131 may be provided with an equivalent member 140 fixed thereto, a belt or equivalent member 141 connecting the members 139 and 140 so that upon rotation of the section 134 through the medium of the hand wheel 138, a corresponding rotation of the shaft 131 will occur in the desired direction of rotation.

Threaded on the shaft 131 is a nut member 142 having a spherical outer surface upon which is mounted for universal movement through a suitable supporting spider member 143, a ring member 144. The spider member 143 and ring member 144 are fixed to each other against relative rotation and the spider member 143, although universally movable on the nut 142, is held against relative rotation with respect to the latter about the axis of the shaft 131 in any suitable manner. At four equally angularly spaced points on the ring member 144 bracket members 145 are provided. The lower end of a rod 146 is pivotally connected as at 147 to each of these brackets 145. The rods 146 extend upwardly to and are pivotally connected with the disc member 127 within the recess 117 of the hub 53, as at 148 and as illustrated best in Fig. 12.

With the construction thus far described it will be apparent that the vertical position of the disc 127 on the shaft 52 is controlled by the corresponding position of the nut 142 on the shaft 131, and the vertical position of the nut 142 may be manually controlled through turning of the hand wheel 138 and the joy stick 135. It will also be apparent that the disc member 127, in varying its position vertically on the shaft 52, will vary the corresponding vertical position of the free ends of the arms 125 with respect to the shaft sections 124, and in thus being varied will vary the rotatable position of the shaft sections 124 in their corresponding bearings. The shaft sections 124 being connected by the universal joints 123 and the shaft sections 121, universal joints 122 and shafts 119 to the corresponding trailing edge sections 118 of the corresponding rotor blades, it will be apparent that the pivotal position of the trailing edge sections 118 may be thus correspondingly controlled, so as to vary the effective angle of attack of the corresponding rotor blades.

By this means the effective pitch of all of the rotor blades may be simultaneously increased or decreased to vary the lift and drag of the rotor to best suit conditions of climbing, landing, or speed in the air.

However, it is oftentimes desirable as previously described, that the effective angle of incidence of the rotor blades in one angular position of rotation of the rotor be varied with respect to the angle of incidence or effective pitch of the blades at some other point in the circle of rotation of the rotor, this primarily for the purpose of controlling the lateral or longitudinal relation of the gyroplane with respect to the ground for either stabilizing or maneuvering reasons. The manner of effecting such variation in the effective pitch of the blades at various points in the circle of rotation of the rotor by the mechanism here described will now be explained.

Referring to Figs. 15 and 16 it will be noted that arms 153, rigidly secured to the spider 143 on opposite sides of the shaft 131 projects upwardly therefrom and are pivotally connected at their upper end as at 154 the opposite ends of a yoke 155 extending forwardly therefrom. The yoke 155 is rigidly secured to the rear end of the forwardly extending shaft or tube 156. The forward end of the shaft 156 is provided with a smaller yoke 157 rigidly secured thereto and which in turn is pivotally connected by means of pins 158 to a collar member 159 rotatable upon the joy-stick 135 and maintained against axial movement thereof by the ring members 160 disposed above and below the same.

This mechanism provides a connection between the joy-stick 135 and the spider 143 such that when the joy-stick is pivoted in a forwardly or rearwardly direction about the universal joint 136, a similar movement is imparted to the arms 153 and these in turn cause the spider 143 and the ring member 144 to pivot above the center of the ball member 142 in the same direction, causing vertical movement of the rods 146 to the front of and to the rear of the screw 131, in opposite directions. For instance, when the wheel 138 of the joy stick 135 is moved forwardly the forward edge of the spider member 143 and ring 144 is moved downwardly while the rear edge thereof is moved upwardly, causing a corresponding movement of the forward and rearward members or rods 146 respectively. When the forward rod 146 moves upwardly the forward edge of the disc 127 carried by the upper ball member 126 within the rotor hub 53 is given an equivalent movement, the disc member 127 moving about the axis of the ball 126 in exact accordance with the movement of the ring 144.

When the forward edge of the disc 127 moves upwardly and consequently the rear edge thereof downwardly it causes a pivotal movement of the flaps 118 carried by the rotor blades 90 degrees removed therefrom in the direction opposite to the direction of the rotation of the rotor, as will be apparent from an inspection of Fig. 11 and the description thereof previously given. Obviously, the flap carried by those blades which at any time may be disposed with their length parallel to the longitudinal axis of the plane at any particular moment will not be affected by this forward or rearward movement of the joy stick 135. The reason that the construction is such that upon forward or rearward movement of the joy stick the flap on those blades which at any time extends laterally with respect to the longitudinal axis of the plane are acted upon rather than those extending in the general direction of such axis is, as previously described, due to the fact that the reaction of any blade of the rotor makes itself apparent upon the gyroplane in a direction perpendicular to the length of such blade, and consequently it is those rotor blades that may be extending laterally with respect to the aircraft at any particular moment that, disregarding the fixed surfaces, controls the relation of the longitudinal axis of the plane with respect to the ground.

In a like manner it is the reaction of those blades which are at any moment extending approximately parallel with the longitudinal axis of the blade that control the lateral stability of the plane, and consequently the construction of the control means now under discussion is such that upon lateral movement of the joy stick about its pivotal support, namely, the universal joint 136, the effective pitch of the rotor blades extending in the general direction of the length of the blade is varied.

The manner in which this is accomplished will be apparent from an inspection of Figs. 15 and 16 wherein it will be noted that if the wheel 138 of the joy stick 135 is moved in a direction perpendicular to the plane of the paper a similar movement will be given to the shaft 156 which will transmit such movement, through torque, to the yoke 155 and then through the arms 153 to the spider member 143 and ring 144. This movement will cause a like movement of the disc 127 and such movement of the disc 127 will cause a movement of those blades extending at any time in the general direction of length of the gyroplane, of the same character as described in connection with the forward and rearward movement of the joy stick. Obviously, both movements of the joy stick may occur at one time resulting in an equivalent combination of movement of the spiders 143 and the disc 127 and consequent variation in the effective pitch of the rotor blades. By this means the rotor blades may be effectively employed for the purpose of controlling the lateral and longitudinal stability of the airplane as well as be employed for maneuvering purposes.

The same effect may be obtained in the control of the effective pitch of the rotor blades by the employment of a hydraulic control device, in which case some advantages may be apparent over the mechanical construction heretofore described in that it permits a wider choice in the positioning of the joy stick without possible interference with other parts of the gyroplane. Such a construction is illustrated more or less diagrammatically in Fig. 17 in which it will be noted that the shaft 52', ball 126, disc member 127 and rods 146 the same as in the previously described construction are employed, it being understood that the construction of the rotor itself is the same as that illustrated in Figs. 11 and 12, or an equivalent thereof. In this form of construction the joy stick 163 takes the form of a shaft threaded at its lower end as at 164 and terminating at such end in a ball 165 swiveled in a suitable fixed supporting member 166. The upper end of the joy stick 163 is preferably provided with a hand wheel 167 or equivalent means. Threadably received of the threaded portion 164 of the joy stick 163 is what may be termed a spider member 168 having four outwardly opening peripheral sockets 169 therein equally spaced angularly around the spider member 168. An outwardly and downwardly extending skirt 170 is provided on the spider 168 for the purpose of protecting a portion of the mechanism therebelow that will hereinafter be described.

Arranged in a circle about the normal vertical axis of the joy stick 163 and pivotally secured as at 171 at their lower ends to brackets such as 172 fixed to a suitable supporting member such as 173 for movement in planes radial to such axis, are four vertically extending cylinders 175. These cylinders are closed at both ends and are interiorly provided with pistons 176 connected by rods 177 projecting through the upper ends thereof with the inwardly curved end portions 178 terminating in balls 179 received in the sockets 169 of the spider member 168. Any suitable means are provided to prevent relative rotation of the spider 168 so as to maintain the relative cooperative relationship between the spider and the balls 179.

The lower ends of the rods 146 pivotally secured to the disc 127 are similarly provided with pistons 184 received in the cylinders 185. The cylinders 185 may be suitably received within the fairing for the mast 51 or be otherwise suitably located. Conduits 186 connect the upper end of each of the cylinders 175 with the lower end of the corresponding cylinders 185 and conduits 187 connect the lower end of each of the cylinders 175 with the upper end of the corresponding cylinders 185. It will be understood that the cylinders 175 and 185 and the conduits 186 and 187 are maintained at all times filled with a suitable liquid.

With this construction it will be apparent that if the hand wheel 167 is rotated so as to move the spider 168 downwardly, thus causing the corresponding movement of all of the pistons 176, the liquid below the pistons 176 will be displaced outwardly through the tubes 187 to the upper ends of the cylinders 185 and cause a corresponding downward movement of all the pistons 184 and rods 146. This will cause a corresponding bodily downward movement of the disc 127 and corresponding upward movement of the trailing edges of the flaps 118, thus decreasing the effective pitch of the rotor blade. Similarly opposite rotational movement of the hand wheel 167 will cause a reversal of the movement just described, resulting in an increase in the effective pitch of the rotor blades. Also, as will be readily apparent, pivotal or swinging movement of the joy stick 163 about the center of the ball 165 will cause some of the pistons 176 to rise and others thereof to move downwardly, thus causing a corresponding tilting movement of the disc 127 with the consequent variation in the effective pitch of the rotor blades during different positions in their rotation.

In connection with the problem of storage it will be apparent that the minimum width required for storage purposes will depend upon either the maximum width of the fixed controlled surfaces or the minimum width of the rotor blades assembly when turned to a position to realize the minimum effective width thereof. Where the rotor blades are not made up of three or more sections as heretofore described, or even in case where such a number of sections are employed but fixed control surfaces of heretofore unusually small dimensions laterally of the aircraft are employed, it may be desirable in some cases to somewhat vary the angular relationship between adjacent rotor blades so as to effect a still smaller minimum effective lateral dimension of the rotor when stationary. Such construction is suggested in Fig. 23 in which a gyroplane is illustrated as having a fuselage 189 and fixed control surfaces 190 in substantially the same manner as the constructions heretofore described with the possible exception that the control surfaces 190 have a smaller effective dimension laterally of the longitudinal axis of the aircraft. The rotor in this case indicated generally as at 191 is provided with blades including a relatively noncontractible section 192 and a relatively extensible and contractible section 193, although as previously mentioned an intermediate hinge section may be employed where desired in the same manner as in the constructions heretofore discussed. In this figure the rotor blades are not positioned at equal angles with respect to each other but instead their angular relationship is varied so as to bring opposite pairs of blades into an angular relation of less than 90 degrees to each other with respect to the axis rotation of the rotor, thus effecting a greater angular relationship than 90 degrees between the adjacent blades of each of these pairs. Due to this construction when it is desired to prepare the gyroplane for storage purposes those pairs of blades having the smallest angular relationship with respect to each other are positioned with a line bisecting their angular relationship in a position parallel, in plan view with the longitudinal axis of the gyroplane. Thus the effective lateral width of the rotor is materially reduced for storage purposes over the construction previously described in which the rotor blades were disposed at the same angle with respect to both the adjacent blades.

In cases where the angular relationship of the adjacent rotor blades is varied as above described I find it generally desirable to vary the effective pitch of that blade which follows the adjacent blade disposed at the least angular relationship with respect to it. This feature is brought out in Figs. 24 and 25, wherein the blades indicated generally as at 192a precedes the blade indicated generally at 192b in direction of rotation and which is the closest blade thereto in angular relationship about the axis of the rotor. As indicated in Figs. 24 and 25, the effective pitch of the blade 192a is not as great as the effective blade 192b which follows it, this being for the purpose of compensating for any loss of lift that might otherwise occur due to the fact that the blade 192b may be traveling in air which has been disturbed by the blade 192a.

In connection with the engine and propeller mounting for my gyroplane, it will be observed from an inspection of Figs. 1 and 2 that the engine, which is indicated at 195, is preferably of the inverted type and positioned in the upper part of the fuselage 30 at the rear end thereof. The drive from the engine 195 to the propeller shaft 198 is taken through a pair of gears 196 and 197, the propeller shaft 198 being positioned above the engine so as to provide a greater amount of ground clearance for the propeller 199 which overhangs the back end of the fuselage. The gears 196 and 197, together with the bearings (not shown) for the propeller shaft 198, are preferably housed in a streamlined housing member 200 rigidly secured to the engine 195. It might be noted at this point that for the purpose of forming a guard for the propeller 199 in order to aid in preventing persons from inadvertently coming in contact therewith during rotation, extensions such as 201 are provided at the outer ends of the pilot surfaces 91, and which extensions project rearwardly of the plane of rotation of the propeller.

The air introduced into the mast 51 in the manner previously described is carried downwardly and is directed by means of a suitable deflector wall such as 202, best shown in Fig. 2, into intimate contact with the engine 195 and then escapes from the fuselage 30 through suitable louvres 203 provided at the rear end thereof. This arrangement of engine mounting and cooling means therefor is extremely effective in operation, and the construction further provides a compact arrangement of the power plant together with a location thereof permitting a favorable passenger carrying arrangement.

Formal changes may be made in the specific embodiment of the invention described without departing from the spirit or substance of the broad invention, the scope of which is commensurate with the appended claims.

I claim:

1. In a rotor, a blade including a pair of sections hinged together at adjacent ends, one of said sections having a trailing edge movable relative thereto.

2. In a rotor, a blade including a pair of effective blade sections hinged together in generally end-to-end relationship about a line skewed with respect to a plane perpendicular to the length of said blade.

3. In a rotor, a hub structure, and a blade secured thereto including a pair of sections hinged together about a line skewed with respect to a plane perpendicular to the axis of rotation of said rotor.

4. A rotor blade having at least a portion thereof adapted to assume a substantially depending position when at rest and including a pair of sections telescopically engaging each other, and spring means constantly urging said sections into telescoping relation and exerting a force thereon appreciably in excess of that required to maintain such telescopic engagement of said sections against the greatest gravity component applicable thereto.

5. A rotor blade including at least three sections, two of which are hinged together and two of which are slidable relative to each other.

6. A rotor including a hub portion of lenticular formation having segments thereof hinged to the main body portion thereof, and blades secured to said segments.

7. In a rotor, a hub of lenticular formation, segmental portions thereof being pivotally secured to the main body portion thereof, and means constantly urging said segmental portions to one extremity of their pivotal position.

8. In a gyroplane rotor, in combination, a hub of lenticular formation, segments of said hub being separated from the main body portion thereof and being secured thereto by hinged means, the pivotal line of said hinged means being skewed with respect to a plane perpendicular to the axis of rotation of said rotor.

9. In a gyroplane rotor, in combination, a hub member of lenticular formation, segmental portions of said hub member being separated from and pivotally secured to the main body portion thereof, a blade carried by each of said segmental portions, and the pivot line of the pivotal connection for each of said sections being skewed with respect to a plane perpendicular to the length of the corresponding of said blades.

10. In an aircraft, in combination, a pair of forwardly located main control surfaces, a pair of auxiliary control surfaces adjacent the rear thereof, means operatively connecting said auxiliary control surfaces with said main control surfaces, and manually controllable means for controlling said main control surfaces only through said auxiliary control surfaces.

11. In an aircraft, in combination, a streamlined structural rotor support the trailing edge of which constitutes a rudder including a pair of coextensive surfaces, and selective means for moving said surfaces in either the same or opposite directions.

12. In a gyroplane, a rotor mast of airfoil section including at its trailing edge a pair of coextensive and independently pivoted sections, means constantly urging said sections towards each other, and means for urging said sections apart in opposition to the first mentioned means.

13. In a gyroplane, in combination, a fuselage, and a mast projecting upwardly from said fuselage and formed to provide an air duct for engine cooling purposes.

14. In a gyroplane, in combination, a fuselage, a mast projecting upwardly from said fuselage and forming a duct for engine cooling air, and shutters on said mast for controlling the flow of air thereinto.

15. In an aircraft, in combination, a propeller, a control surface located adjacent the periphery of said propeller, and a guard, carried by said control surface, extending into protective relation with respect to the path of movement of said propeller.

16. In a gyroplane, in combination, a rotor having blades including three or more sections, the outer two sections of which are arranged to slide with respect to each other and the inner two sections of which are hingedly connected together, a lenticular base section for said rotor, means hingedly securing the root of each of said blades to said hub section, a flexible trailing edge pivoted to one or more sections of each of said blades, a torque rod connected to each of said flexible trailing edges and extending into said hub section, and means for controlling the rotatable positions of said torque rod.

17. In a rotor, a hub of lenticular formation, segmental portions thereof being hingedly secured to the main body portion thereof, and blades rigidly secured to said segmental portions.

18. In a gyroplane rotor, in combination, a hub of lenticular formation, segments of said hub being pivotally secured thereto, and means constantly urging said segments to rotate toward their uppermost position.

19. In a gyroplane rotor, in combination, a hub member of disc-like formation, segmental portions of said disc being separated from and hingedly secured to the main body portion thereof, a blade secured to each of said segmental portions, and spring means constantly urging said segmental portions to their highest pivotal position, said spring means exerting sufficient force to appreciably overcome the weight of said blades tending to rotate said segmental portions towards their lowest pivotal position.

20. In an aircraft, in combination, a rotor support additionally supporting a unitary rudder structure including a pair of co-extensive surfaces, and means for supporting said surfaces for independent pivotal movement.

21. In an aircraft, in combination, a rudder including a rotor support additionally supporting a pair of independently movable sections, means constantly urging said sections toward simultaneous equal movement, and means for moving said sections in opposite directions against the force of the first mentioned means.

22. In a gyroplane, in combination, a fuselage, a mast projecting upwardly from said fuselage and forming a duct for engine cooling air, said mast being provided with an opening in a face thereof for the flow of air into said mast.

23. In a gyroplane, in combination, a fuselage, a mast projecting upwardly from said fuselage and forming a duct for engine cooling air, shutters carried by said mast for controlling the flow of air thereinto, and means for controlling the position of said shutters.

24. A rotor including a hub, blades projecting therefrom, movable trailing edges on said blades, and hydraulically actuated means for moving said trailing edges either differentially or in the same relative directions relative to said blades.

25. A rotor including a hub, blades projecting therefrom, movable trailing edges on said blades, and hydraulically actuated means for continuously moving said trailing edges relative to said blades during rotation of said rotor.

26. A rotor including a hub, blades projecting therefrom, movable trailing edges on said blades, and hydraulically actuated means for moving said trailing edges relative to said blades and differentially with respect to each other.

27. A gyroplane rotor including a hub and blades movably mounted thereon, each of said blades including at least two sections pivotally secured to each other in end-to-end relationship.

28. A gyroplane rotor including a hub, blades movably mounted thereon, each of said blades including at least two sections pivotally secured to each other in end-to-end relationship and means for varying the pitch of said blades in flight.

RALPH H. UPSON.